United States Patent
Gan et al.

(10) Patent No.: US 12,344,296 B2
(45) Date of Patent: Jul. 1, 2025

(54) MULTI-STATION INTEGRATED CODE SENDING CONTROL METHOD, ELECTRONIC EQUIPMENT AND MEDIUM

(71) Applicant: CASCO SIGNAL LTD., Shanghai (CN)

(72) Inventors: Qingpeng Gan, Shanghai (CN); Xianliang Xu, Shanghai (CN); Hongjun Jiang, Shanghai (CN); Xiangyi Li, Shanghai (CN); Shangding Jin, Shanghai (CN); Fei Lu, Shanghai (CN); Xinyuan Liu, Shanghai (CN); Wenhao Shi, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 332 days.

(21) Appl. No.: 18/016,457

(22) PCT Filed: Sep. 23, 2021

(86) PCT No.: PCT/CN2021/119772
§ 371 (c)(1),
(2) Date: Jan. 17, 2023

(87) PCT Pub. No.: WO2022/241989
PCT Pub. Date: Nov. 24, 2022

(65) Prior Publication Data
US 2023/0264725 A1   Aug. 24, 2023

(30) Foreign Application Priority Data
May 21, 2021 (CN) .................... 202110554943.9

(51) Int. Cl.
*B61L 27/70* (2022.01)
*B61L 27/20* (2022.01)

(52) U.S. Cl.
CPC .............. *B61L 27/70* (2022.01); *B61L 27/20* (2022.01)

(58) Field of Classification Search
CPC ................................. B61L 27/20; B61L 27/70
See application file for complete search history.

(56) References Cited

U.S. PATENT DOCUMENTS

| | | | | |
|---|---|---|---|---|
| 3,734,433 A | * | 5/1973 | Metzner | G05D 1/0229 246/187 B |
| 2019/0308643 A1 | * | 10/2019 | Liu | B61L 25/02 |

\* cited by examiner

*Primary Examiner* — Seth A Silverman
(74) *Attorney, Agent, or Firm* — JCIPRNET

(57) ABSTRACT

The invention relates to a multi-station integrated code sending control method, an electronic device and a medium. The method comprises the following steps: 1. supervising, by a train control and interlock integration device, a plurality of adjacent stations; 2. connecting the train control and interlock integration device to a train control center device or a train control and interlock integration device of other adjacent non-integrated stations through a communication interface; 3. dividing all integrated stations into stops, relay stations, lines and non-wiring stations according to station types; and 4. determining low-frequency codes of all stations through cyclic traversal to realize the code sending function. Compared with the prior art, the invention has the advantage of being high in efficiency.

21 Claims, 2 Drawing Sheets

MULTI-STATION INTEGRATED CODE SENDING CONTROL METHOD, ELECTRONIC EQUIPMENT AND MEDIUM

CROSS-REFERENCE TO RELATED APPLICATION

This application is a 371 of international application of PCT application serial no. PCT/CN2021/119772, filed on Sep. 23, 2021, which claims priority to Chinese Patent Application No. 202110554943.9, filed on May 21, 2021. The entirety of each of the above mentioned patent applications is hereby incorporated by reference herein and made a part of this specification.

BACKGROUND OF THE INVENTION

Technical Field

The invention relates to a train signal control system, in particular to a multi-station integrated code sending control method, electronic equipment and a medium in a scene of train control and interlock integration control of multiple stations of a high-speed railway.

Description of Related Art

With the rapid development of China's high-speed railway, the demand for the control scenes of the new generation of high-speed railway train operation control system is becoming more and more complex, and the requirement for the safety of system functions is getting higher and higher. As an important part of the ground control function of the new generation of train operation control system, train control and interlock integration will play a vital role.

Integrated control of several adjacent stations involves special scenes and complex logic. As an advanced technology, a train control and interlock integration system is expected to have better functions. As the core of the integrated control function, code sending of intra-station zones and section zones directly affects driving safety, so it is particularly important.

Code sending control of an existing train control system is implemented in one station, and the continuity of section code sending is ensured through communication between stations. Code sending of a zone on a route in a station is related to that of a section zone, so section and intra-station zone code sending logic can be realized quickly.

Compared with code sending control of a single station, integrated code sending control of multiple stations is more complicated in logic, because different stations are subjected to internal integrated control and interact with each other through sections. Thus, the simple logic of single station is no longer applicable, and it is necessary to put forward a more effective and applicable implementation method to meet the code sending requirements of zones and ensure driving safety, which is also a technical problem to be solved.

BRIEF SUMMARY OF THE INVENTION

The purpose of the invention is to provide a multi-station integrated code sending control method, electronic equipment and a medium in order to overcome the defects of the prior art.

The purpose of the invention can be realized by the following technical scheme.

According to one aspect of the invention, a multi-station integrated code sending control method is provided, which comprises the following steps:

step 1. supervising, by a train control and interlock integration device, a plurality of adjacent stations;

step 2. connecting the train control and interlock integration device to a train control center device or a train control and interlock integration device of other adjacent non-integrated stations through a communication interface;

step 3. dividing all integrated stations into stops, relay stations, lines and non-wiring stations according to station types; and step 4. determining low-frequency codes of all stations through cyclic traversal to realize the code sending function.

As a preferred technical scheme, all the integrated stations are arranged with different routes according to an operation plan, all departure ports are changed to different directions according to operation requirements, and the arrangement of routes in the stations is displayed through a display device.

As a preferred technical scheme, different stations in the step 3 are supervised according to sections and routes, the sections are supervised according to block ranges and zones, and the routes are supervised according to track zones and route zones.

As a preferred technical scheme, the cyclic traversal in the step 4 is to circularly traverse all the configured stations in order; assuming that the total number of stations is N, the maximum number of traversal times is N*N; and the low-frequency code of a certain station should be able to be determined in at least one time of traversal.

As a preferred technical scheme, the traversal in the step 4 comprises station traversal in a receiving direction and station traversal in a departure direction, and the station traversal in the receiving direction is completed before the station traversal in the departure direction.

As a preferred technical scheme, the station traversal in the receiving direction comprises: traversing established receiving routes and calculating low-frequency codes thereof, and then conducting section traversal in the receiving direction and calculating low-frequency codes thereof.

As a preferred technical scheme, traversing established receiving routes and calculating low-frequency codes thereof specifically comprises:

step 101. traversing an established receiving route which is marked as Route-1, searching ahead for the Route-2 in an established state forming a splicing route with the Route-1 according to optimized data configuration, then searching ahead for a Route-3 in an established state forming a splicing route with the Route-2 based on the Route-2, and so on, and determining a complete splicing route from the Route-1 to a route-E;

step 102. determining the low-frequency codes according to a reverse order of the splicing routes, combining Route-1, Route-2, Route-3, . . . , Route-E, and determining the low-frequency codes of all the routes backwards from Route-E;

step 103. determining the low-frequency code of a farthest route;

step 104. determining a first low-frequency coding logic of first departure of sections;

step 105. determining a second low-frequency coding logic of first departure of sections;

step 106. determining a third low-frequency coding logic of first departure of sections; and step 107. determining a fourth low-frequency coding logic of first departure of sections;

As a preferred technical scheme, in the step 102, if the low-frequency code of a certain route has been determined or can be determined, a route behind can track the route for code sending; and if the low-frequency code of a route cannot be determined temporarily, all routes behind cannot be determined at this time of station traversal, and the processing for this route is skipped till traversal to Route-1 in the next time of station traversal.

As a preferred technical scheme, in the step 103, specifically, whether the low-frequency code of the Route-E can be determined is determined; if a terminal signal is not a departure port signal, it means that the Route-E terminal is in a throat area, and code sending can be determined; if the terminal signal is a departure port signal, the Route-E tracks the low-frequency code of a first zone in a section departure direction, and the low-frequency code of the first zone in the section departure direction needs to be determined; and a Section-1 of the current station adjacent to the Route-E is acquired.

As a preferred technical scheme, in the step 104, specifically, the state of the Section-1 is checked forward, the occupied state of a block range, the state of foreign object intrusion, and the state of red light wire breakage are checked, and if the low-frequency code of a block range can be determined, the low-frequency code of the first zone in the section departure direction can be determined in a reverse order according to a tracking coding relationship.

As a preferred technical scheme, in the step 105, specifically, when the low-frequency code of the first zone in the section departure direction cannot be determined by checking the Section-1 of the current station, a Section-2 of an adjacent station is checked; if the adjacent station is a communication station, the Section-2 does not exist, and the low-frequency code at a boundary can be determined according to boundary low-frequency code information transmitted by the adjacent station, so that the low-frequency code of the first zone in the section departure direction can be obtained in a reverse order; and if the adjacent station is a station under integrated supervision, the Section-2 of the adjacent station section is checked according to step 104.

As a preferred technical scheme, in the step 106, specifically, if the low-frequency code cannot be determined by checking the Section-2 of the adjacent station, for a relay station, processing is exited to return to the step 101 and the low-frequency coding processing of this receiving route Route-1 is finished, and for a stop, a home signal of the Section-2 of the adjacent station and the state of an arranged receiving route are checked.

As a preferred technical scheme, in the step 107, specifically, when the home signal corresponding to the step 106 is turned on but the low-frequency code of an arranged receiving route is not determined in this time of station traversal, processing is exited to return to step 101, and the low-frequency coding processing of this receiving route Route-1 is finished; and when the home signal is turned off or the low-frequency code of the arranged receiving route has been determined, the low-frequency code of an approach zone of the adjacent station corresponding to the Section-2 of the adjacent station can be determined according to the tracking relationship, so that the low-frequency code of the first zone in the section departure direction of the Section-1 of the current station can be obtained in a reverse order.

As a preferred technical scheme, conducting section traversal in the receiving direction and calculating low-frequency codes thereof comprises:

step 201. conducting section traversal in the receiving direction to determine the low-frequency code of an approach zone of a Section-0, and finally determining the low-frequency code of the whole Section-0 in a reverse order;

step 202. determining a first low-frequency coding logic of an approach zone of a section;

step 203. determining a second low-frequency coding logic of an approach zone of a section; and step 204. determining the low-frequency code of a receiving zone, and obtaining the low-frequency code of the whole Section-0 in a reverse order according to the low-frequency code of the approach zone.

As a preferred technical scheme, in the step 202, specifically, for a relay station, an adjacent station in front is analyzed; if the adjacent station is a communication station, the low-frequency code at a boundary is determined according to boundary low-frequency code information transmitted by the adjacent station, so as to obtain the low-frequency code of an approach zone; and if the adjacent station is a station under integrated control, processing is exited to return to the step 201, and this time of section traversal will not be processed for the time being.

As a preferred technical scheme, in the step 203, specifically, for a non-relay station, a home signal of the current receiving section Section-0 and the state of an arranged receiving route are checked; and if the home signal is turned on but the low-frequency code of an arranged receiving route is not determined in this time of station traversal, processing is exited to return to the step 201, and otherwise, the low-frequency code of an approaching zone can be determined according to the tracking relationship.

As a preferred technical scheme, the station traversal in the departure direction specifically comprises: for each time of independent traversal, conducting section traversal in the departure direction and calculating low-frequency codes thereof first, and then traversing established departure routes and calculating low-frequency codes thereof.

As a preferred technical scheme, during section traversal in the departure direction, specifically, consistent with the section processing logic in the receiving direction, an "approach zone" is converted into a "boundary zone", and after the low-frequency code of the boundary zone is determined, the low-frequency code of the whole section in the departure direction is determined in a reverse order.

As a preferred technical scheme, the traversal of the departure route is consistent with the processing logic of the receiving route, the splicing routes are searched, the adjacent sections are checked, the low-frequency code of the first zone in the section departure direction is obtained, and all the splicing routes are obtained in a reverse order.

According to a second aspect of the invention, an electronic device is provided, which comprises a memory and a processor, a computer program is stored on the memory, and the processor implements the method when executing the program.

According to a third aspect of the invention, a computer-readable storage medium on which a computer program is stored is provided, and the program, when executed by a processor, implements the method.

Compared with the prior art, the invention has the following advantages.

1. The invention can be used in a scene of train control and interlock integration control of multiple stations. By configuring the design requirements, the invention is not limited by the number of stations, station types, station adjacency, section code sending characteristics, route splicing relationship, route code sending attributes, etc., and can meet complex and diverse design requirements.
2. The invention can be used in a scene of train control and interlock integration control of a single station, and can also be used in a scene of controlling a single station in an existing train control center, so as to meet the algorithm compatibility of different systems.
3. The invention can quickly conduct low-frequency coding on all stations under integrated control, and realize code sending of zones of all sections and routes in a single cycle, with high efficiency.
4. The invention realizes low-frequency coding of sections and routes according to technical specifications, ensuring the continuity of inter-station code sending and ensuring the safety of functions.

DETAILED DESCRIPTION OF THE INVENTION

Figure 1:
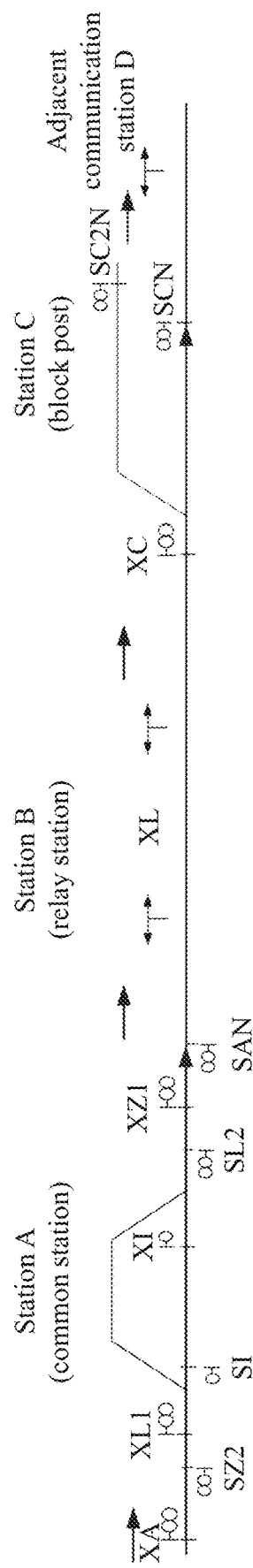
FIG. 1 is a typical connection diagram of a train control and interlock integration multi-station control scene.

Hereinafter, the technical scheme in the embodiments of the invention will be described clearly and completely with reference to the drawings in the embodiments of the invention. Obviously, the described embodiments are only part of the embodiments of the invention, not all of the embodiments. Based on the embodiments of the invention, all other embodiments obtained by those of ordinary skill in the art without creative labor are within the scope of the invention.

A multi-station integrated code sending control method of the invention specifically comprises the following steps:

step S1. supervising, by a train control and interlock integration device, a plurality of adjacent stations, wherein the arrangement of routes in the stations is displayed through a display device, all the integrated stations can be arranged with different routes according to an operation plan, and all departure ports can be changed to different directions according to operation requirements;

step S2, connecting the train control and interlock integration device to a train control center device or a train control and interlock integration device of other adjacent non-integrated stations through a communication interface, so as to realize the continuity of boundary low-frequency coding;

step S3, dividing all integrated stations into stops, relay stations, lines and non-wiring stations according to station types, wherein different stations are supervised according to sections and routes, the sections are supervised according to block ranges and zones, and the routes are supervised according to track zones and route zones;

step S4, determining low-frequency codes of all stations through cyclic traversal to realize the code sending function, wherein all the configured stations are circularly traversed in order; assuming that the total number of stations is N, the maximum number of traversal times is N*N; and the low-frequency code of a certain station should be able to be determined in at least one time of traversal;

step S5, dividing traversal into two independent station traversal modes (N*N times for both), namely, station traversal in a receiving direction and station traversal in a departure direction, wherein the station traversal in the receiving direction is completed before the station traversal in the departure direction;

step S6, conducting the station traversal in the receiving direction, wherein each time of independent traversal comprises: traversing established receiving routes and calculating low-frequency codes thereof, and then conducting section traversal in the receiving direction and calculating low-frequency codes thereof;

step S7, traversing receiving routes, which comprises: traversing an established receiving route which is marked as Route-1, searching ahead for the Route-2 in an established state forming a splicing route with the Route-1 according to optimized data configuration, then searching ahead for a Route-3 in an established state forming a splicing route with the Route-2 based on the Route-2, and so on, and determining a complete splicing route from the Route-1 to a route-E; wherein forward routes such as Route-2, Route-3 and Route-E may be receiving routes or departure routes;

step S8, determining the low-frequency codes according to a reverse order of the splicing routes, combining Route-1, Route-2, Route-3, . . . , Route-E, and determining the low-frequency codes of all the routes backwards from Route-E, wherein if the low-frequency code of a certain route has been determined or can be determined, a route behind can track the route for code sending; and if the low-frequency code of a route cannot be determined temporarily, all routes behind cannot be determined at this time of station traversal, and the processing for this route is skipped to return to traversing receiving routes in step S7 till traversal to the Route-1 in the next time of station traversal;

step S9, determining the low-frequency code of a farthest route, wherein whether the low-frequency code of the Route-E can be determined is determined; if a terminal signal is not a departure port signal, it means that the Route-E terminal is in a throat area, and code sending can be determined; if the terminal signal is a departure port signal, the Route-E tracks the low-frequency code of a first zone in a section departure direction (first departure), and the low-frequency code of the first departure of sections needs to be determined; and a Section-1 of the current station adjacent to the Route-E is acquired;

step S10, determining a first low-frequency coding logic of the first departure of sections, wherein the state of the Section-1 is checked forward, the occupied state of a block range, the state of foreign object intrusion, and the state of red light wire breakage are checked, and if the low-frequency code of a block range can be determined, the low-frequency code of the first departure can be determined in a reverse order according to a tracking coding relationship;

step S11, determining a second low-frequency coding logic of the first departure of sections, wherein when the low-frequency code of the first departure cannot be determined by checking the Section-1 of the current station, a Section-2 of an adjacent station is checked; if the adjacent station is a communication station, the Section-2 does not exist, and the low-frequency code at a boundary can be determined according to boundary low-frequency code information transmitted by the adjacent station, so that the low-frequency code of the first departure can be obtained in a reverse order; and if the adjacent station is a station under integrated supervision, the Section-2 of the adjacent station section is checked according to the step S10;

step S12, determining a third low-frequency coding logic of the first departure of sections, wherein if the low-frequency code cannot be determined by checking the Section-2 of the adjacent station, for a relay station, processing is exited to return to the step S7 and the low-frequency coding processing of this receiving route Route-1 is finished, and for a stop, a home signal of the Section-2 of the adjacent station and the state of an arranged receiving route are checked;

step S13, determining a fourth low-frequency coding logic of the first departure of sections, wherein when the home signal corresponding to the step S12 is turned on but the low-frequency code of an arranged receiving route is not determined in this time of station traversal, processing is exited to return to the step S7, and the low-frequency coding processing of this receiving route Route-1 is finished; and when the home signal is turned off or the low-frequency code of the arranged receiving route has been determined, the low-frequency code of an approach zone of the adjacent station corresponding to the Section-2 of the adjacent station can be determined according to the tracking relationship, so that the low-frequency code of the first departure of the Section-1 of the current station can be obtained in a reverse order;

then ending the determination of the low-frequency code of the farthest route in the step S9, ending the determination of the low-frequency codes according to a reverse order of the splicing routes in the step S8, and ending receiving route traversal in the step S7;

step S14, conducting section traversal in the receiving direction to determine the low-frequency code of an approach zone of a Section-0, and finally determining the low-frequency code of the whole Section-0 in a reverse order;

step S15, determining a first low-frequency coding logic of an approach zone of a section, wherein for a relay station, an adjacent station in front is analyzed; if the adjacent station is a communication station, the low-frequency code at a boundary is determined according to boundary low-frequency code information transmitted by the adjacent station, so as to obtain the low-frequency code of an approach zone (a boundary in front of a receiving direction of the relay station is also considered as an approach zone); and if the adjacent station is a station under integrated control, processing is exited to return to the step S14, and this time of section traversal will not be processed for the time being;

step S16, determining a second low-frequency coding logic of an approach zone of a section, wherein for a non-relay station, a home signal of the current receiving section Section-0 and the state of an arranged receiving route are checked, referring to the step S13; and if the home signal is turned on but the low-frequency code of an arranged receiving route is not determined in this time of station traversal, processing is exited to return to the step S14, and otherwise, the low-frequency code of an approaching zone can be determined according to the tracking relationship;

step S17, determining the low-frequency code of a receiving zone, obtaining the low-frequency code of the whole Section-0 in a reverse order according to the low-frequency code of the approach zone, and returning to the step S14 to continue the traversal;

step S18, ending the section traversal in the receiving direction in the step S14;

step S19, ending the station traversal in the receiving direction in the step S6;

step S20, conducting the station traversal in the departure direction, which specifically comprises: for each time of independent traversal, conducting section traversal in the departure direction and calculating low-frequency codes thereof first, and then traversing established departure routes and calculating low-frequency codes thereof;

step S21, conducting the section traversal in the departure direction, wherein consistent with the section processing logic in the receiving direction, an "approach zone" is converted into a "boundary zone", and after the low-frequency code of the boundary zone is determined, the low-frequency code of the whole section in the departure direction is determined in a reverse order, referring to the steps S14 to S17;

step S22, conducting the traversal of the departure route, wherein consistent with the processing logic of the receiving route, the splicing routes are searched, the adjacent sections are checked, the low-frequency code of the first departure is obtained, and all the splicing routes are obtained in a reverse order, referring to the steps S7-S13; and step S23, ending the station traversal in the departure direction in the step S20.

According to the above technical scheme, the intra-station and section track zone code sending method in the scene of train control and interlock integration control of multiple stations provided by the invention can quickly complete the low-frequency coding of the intra-station routes and inter-station sections of each station through complete route searching and code sending logic by matching different route splicing scenes, and ensure correct code sending of intra-station and section code sending zones of all stations within the supervision scope. The method improves operation efficiency, ensures functional safety and meets the requirement for integrated control of multiple stations.

Specific embodiments are provided below. This embodiment describes the implementation of an intra-station and section zone code sending method in a scene of train control and interlock integration control of multiple stations.

FIG. 1 is a typical station-yard connection diagram in a multi-station scenario. The station A is a common station with a large station yard, and a section without a switch for parking exists in a throat area. The XA section is a receiving direction, a main track passing route is arranged in the station, and the SAN section is a departure direction. The station B is a relay station, and the XL section is a receiving direction. The station C is a block post, the XC section is a receiving direction, a main track receiving route is arranged in the station, the SCN section is a departure direction, and the SCN port is connected to an adjacent communication station D.

Figure 2:
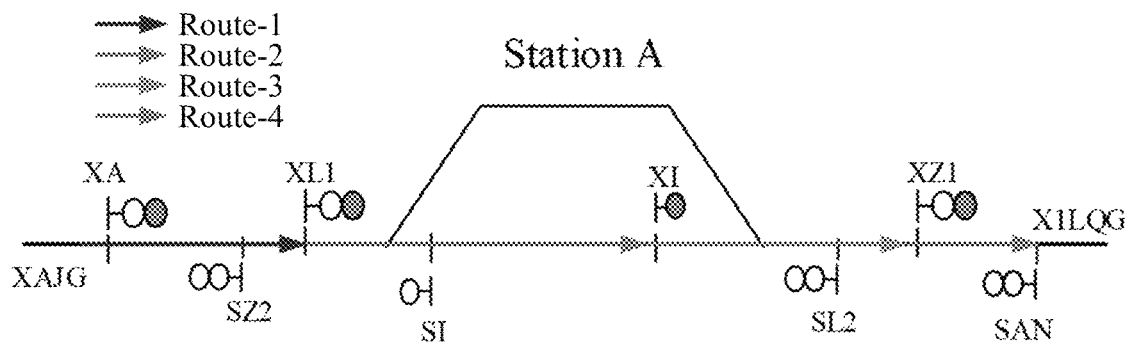
FIG. 2 is a typical diagram of a route through which a station A is arranged.

FIG. 2 shows the route arrangement of the main track in the station A. Route-1 and Route-2 are receiving routes, Route-3 and Route-4 are departure routes, and the departure route Route-4 is adjacent to the SAN section.

Figure 3:
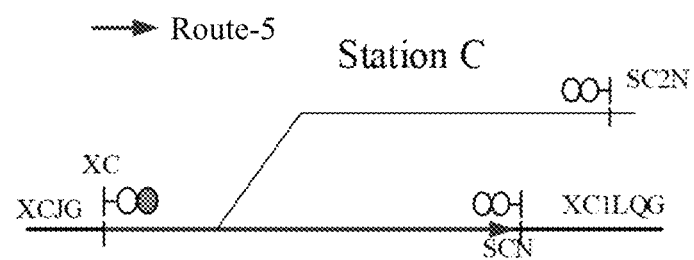
FIG. 3 is a typical diagram of a route through which a station C is arranged.

FIG. 3 shows the arrangement of receiving routes in the station C which is a block post, and Route-5 is a passing route.

The number of station traversal times of the algorithm is 3*3=9 (A, B, C, A, B, C, A, B, C).

Traversal in the receiving direction is explained firstly.

The station A is processed. (Traverse to the station A first time)

Receiving routes (Route-1 and Route-2) established by the station A are traversed.

Route-1 is processed: all established routes in front which can form splicing routes, namely Route-1, Route-2, Route-3 and Route-4 are acquired, Route-4 adjoins the SAN section, and a low-frequency code of a first departure X1LQG is acquired.

The state of the SAN section is checked, and the zone direction, the occupation of block ranges and other conditions for inferring the highest code order and determining the low-frequency code order of sections are checked. If the conditions cannot be met, the section XL of the adjacent relay station B is acquired, and the state of the section is checked. If the conditions are met, the low-frequency code of the XL section can be acquired in a reverse order, and then the low-frequency code of the SAN section can be acquired in a reverse order, so as to obtain the low-frequency code of X1LQG. Route 4 tracks the low-frequency code of X1LQG, Route-3 tracks Route-4, Route-2 tracks Route-3, Route-1 tracks Route-2, and the determination logic of Route-1 code sending is ended.

If the code of the section XL of the station B cannot be determined, it means that the code of the SAN section cannot be determined, and the low-frequency code of Route-4 cannot be determined, so the determination logic of Route-1 code sending is directly skipped to wait for the next time of station traversal. In the worst case, the low-frequency code will be determined when the station A is traversed for the third time, because the station C has already been traversed twice at this point. As a boundary station, an SCN port of the station C can determine a code of first departure and a Route-5 code, and then determine the low-frequency code of the receiving section XC based on the boundary low frequency transmitted by an adjacent communication station. Then the code of XL of the relay station B is also determined.

Route-2 is processed with the same logic as processing Route-1.

The section (XA) in the receiving direction of the station A is traversed.

The section XA is processed. The state of a home signal XA and the state of Route-1 established in the station are analyzed. When the low-frequency code of Route-1 is determined, the low-frequency code of an approach zone XAJG of XA is acquired, and the low-frequency code can be determined through reverse deduction of XA. If the low-frequency code of Route-1 is not determined, the XA processing logic is skipped to wait for the next time of station traversal.

The station B is processed. (Traverse to station B for the first time)

Receiving routes established by the station B are traversed. None.

The section (XL) in the receiving direction of the station B is traversed.

The section XL is processed. There is no home signal. The section XC of the adjacent station C is acquired. The state of the XC section is checked, and the section direction, the occupation of block ranges and other conditions for inferring the highest code order and determining the low-frequency code order of sections are checked.

If the low-frequency code of the XC section cannot be determined, the state of a home signal XC and the state of Route-5 established in the station are analyzed, and the low-frequency code of an approach zone XCJG is determined. If XC is turned on and the code of Route-5 is not determined, it means that the code of the XC section cannot be determined, so the low-frequency code of the section XL of the relay station B cannot be determined. In the worst case, the low-frequency code will be determined when the station B is traversed for the third time, because the station C has already been traversed twice at this point. As a boundary station, an SCN port of the station C can determine a code of first departure and a Route-5 code, and then determine the low-frequency code of the receiving section XC based on the boundary low frequency transmitted by an adjacent communication station.

A station C is processed. (Traverse to station C for the first time)

A receiving route (Route-5) established by the station C is traversed.

Route-5 is processed: all established routes in front which can form splicing routes are processed. All established routes in front which can form splicing routes are acquired. If none, the farthest route is Route-5 itself. A low-frequency code of first departure XC1LQG is acquired.

The state of the XCN section is checked, and the section direction, the occupation of block ranges and other conditions for inferring the highest code order and determining the low-frequency code order of sections are checked. If the conditions cannot be met, according to a boundary low-frequency code transmitted by an adjacent communication station D, the low-frequency code of the first departure XC1LQG of the XCN section is obtained in a reverse order.

The section (XC) in the receiving direction of the station C is traversed.

The section XC is processed. The state of a home signal XC and the state of Route-5 established in the station are analyzed. When the low-frequency code of Route-5 is determined, the low-frequency code of an approach zone XCJG of XC is acquired, and the low-frequency code can be determined through reverse deduction of XC.

The station A is processed. (Traverse to station A for the second time)

Stations B and C are traversed with similar logic, until the three stations are traversed for 9 times.

After completing station traversal in the receiving direction, station traversal in the departure direction is started. Sections (SAN, XL, SCN) in the departure direction and departure routes (Route-3, Route-4) are shown. Similarly, the number of station traversal times of the algorithm is 3*3=9 (A, B, C, A, B, C, A, B, C), which is consistent with the traversal in the receiving direction, and will not be repeated.

It should be noted that state flag bits are added for each route and each section. If a low-frequency code has been determined, the corresponding step can be directly skipped or return to a previous step, so as to improve efficiency. At the same time, for different types of routes, including main track receiving, side track receiving, main track departure and side track departure, and for different route code sending scenarios, including full route code sending and 25 HZ superposition code sending, it is necessary to adapt to the low frequency coding of each route. For the code sending scenes in different sections, it is also necessary to adapt to different scenes. This method only explains the overall universal logic.

The above is the introduction of the method embodiment, and the scheme of the invention will be further explained by the device embodiment below.

The device comprises a central processing unit (CPU) which can execute various appropriate actions and operations according to computer program instructions stored in a read-only memory (ROM) or computer program instructions loaded into a random-access memory (RAM) from a storage unit. In the RAM, various programs and data required for the operation of the device can also be stored. The CPU, ROM and RAM are connected to each other through a bus. An input/output (I/O) interface is also connected to the bus.

Many components in the device are connected to the I/O interface, including: input units such as keyboards and mouses, output units such as various types of displays and speakers, storage units such as magnetic disks and optical disks, and communication units such as network cards, modems and wireless communication transceivers. The communication unit allows the device to exchange information/data with other devices through computer networks such as the Internet and/or various telecommunication networks.

The processing unit executes the various methods and operations described above, such as the steps S1 to S23 of the method. For example, in some embodiments, the steps S1 to S23 of the method are implemented as computer software programs tangibly embodied in a machine-readable medium, such as the storage unit. In some embodiments, part or all of the computer program can be loaded and/or installed on the device via the ROM and/or communication unit. When the computer program is loaded into the RAM and executed by the CPU, one or more steps of the above-described steps S1 to S23 of the method may be performed. Alternatively, in other embodiments, the CPU may be configured to execute the steps S1 to S23 of the method by any other suitable means (for example, by means of firmware).

The functions described above can be at least partially performed by one or more hardware logic components. For example, without limitation, exemplary hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

The program code for implementing the method of the invention can be written in any combination of one or more programming languages. These program codes may be provided to the processors or controllers of general-purpose computers, special-purpose computers or other programmable data processing devices, so that when executed by the processors or controllers, the program codes cause the functions/operations specified in the flowcharts and/or block diagrams to be implemented. The program codes can be completely executed on a machine, partially executed on a machine, partially executed on a machine as an independent software package, partially executed on a remote machine or completely executed on a remote machine or server.

In the context of the invention, a machine-readable medium can be a tangible medium that can contain or store a program for use by or in connection with an instruction execution system, apparatus or device. The machine-readable medium may be a machine-readable signal medium or a machine-readable storage medium. Machine-readable media can include, but are not limited to, electronic, magnetic, optical, electromagnetic, infrared, or semiconductor systems, apparatuses or devices, or any suitable combination of the above. More specific examples of machine-readable storage media will include electrical connection based on one or more wires, portable computer disk, hard disk, random access memory (RAM), read-only memory (ROM), erasable programmable read-only memory (EPROM or flash memory), optical fiber, compact disk read-only memory (CD-ROM), optical storage device, magnetic storage device, or any suitable combination of the above.

The above are only specific embodiments of the invention, but the protection scope of the invention is not limited thereto. Any person familiar with the technical field can easily think of various equivalent modifications or substitutions within the technical scope disclosed by the invention, and these modifications or substitutions should fall within the protection scope of the invention. Therefore, the protection scope of the invention shall be subject to the protection scope of the claims.

What is claimed is:

1. A multi-station integrated code sending control method, comprising the following steps:
   step 1. supervising, by a train control and interlock integration device, a plurality of adjacent stations;
   step 2. connecting the train control and interlock integration device to a train control center device or a train control and interlock integration device of other adjacent non-integrated stations through a communication interface;
   step 3. dividing all integrated stations into stops, relay stations, lines and non-wiring stations according to station types; and
   step 4. determining low-frequency codes of all stations through cyclic traversal to realize the code sending function, wherein the cyclic traversal is to circularly traverse all the configured stations in order.

2. The multi-station integrated code sending control method according to claim 1, wherein all the integrated stations are arranged with different routes according to an operation plan, all departure ports are changed to different directions according to operation requirements, and the arrangement of routes in the stations is displayed through a display device.

3. The multi-station integrated code sending control method according to claim 1, wherein different stations in the step 3 are supervised according to sections and routes, the sections are supervised according to block ranges and zones, and the routes are supervised according to track zones and route zones.

4. The multi-station integrated code sending control method according to claim 1, wherein assuming that the total number of stations is N, the maximum number of traversal times is N*N; and the low-frequency code of a certain station should be able to be determined in at least one time of traversal.

5. The multi-station integrated code sending control method according to claim 1, wherein the traversal in the step 4 comprise station traversal in a receiving direction and station traversal in a departure direction, and the station traversal in the receiving direction is completed before the station traversal in the departure direction.

6. The multi-station integrated code sending control method according to claim 5, wherein the station traversal in the receiving direction comprises: traversing established receiving routes and calculating low-frequency codes thereof, and then conducting section traversal in the receiving direction and calculating low-frequency codes thereof.

7. The multi-station integrated code sending control method according to claim 6, wherein traversing established receiving routes and calculating low-frequency codes thereof specifically comprises:
   step 101. traversing an established receiving route which is marked as Route-1, searching ahead for the Route-2 in an established state forming a splicing route with the Route-1 according to optimized data configuration, then searching ahead for a Route-3 in an established state forming a splicing route with the Route-2 based on the Route-2, and so on, and determining a complete splicing route from the Route-1 to a route-E;
   step 102. determining the low-frequency codes according to a reverse order of the splicing routes, combining Route-1, Route-2, Route-3, . . . , Route-E, and determining the low-frequency codes of all the routes backwards from Route-E;
   step 103. determining the low-frequency code of a farthest route;
   step 104. determining a first low-frequency coding logic of first departure of sections;
   step 105. determining a second low-frequency coding logic of first departure of sections;
   step 106. determining a third low-frequency coding logic of first departure of sections; and
   step 107. determining a fourth low-frequency coding logic of first departure of sections.

8. The multi-station integrated code sending control method according to claim 7, wherein in the step 102, if the low-frequency code of a certain route has been determined or can be determined, a route behind can track the route for code sending; and if the low-frequency code of a route cannot be determined temporarily, all routes behind cannot be determined at this time of station traversal, and the processing for this route is skipped till traversal to the Route-1 in the next time of station traversal.

9. The multi-station integrated code sending control method according to claim 7, wherein in the step 103, specifically,
   whether the low-frequency code of the Route-E can be determined is determined; if a terminal signal is not a departure port signal, it means that the Route-E terminal is in a throat area, and code sending can be determined; if the terminal signal is a departure port signal, the Route-E tracks the low-frequency code of a first zone in a section departure direction, and the low-frequency code of the first zone in the section departure direction needs to be determined; and a Section-1 of the current station adjacent to the Route-E is acquired.

10. The multi-station integrated code sending control method according to claim 9, wherein in the step 104, specifically, the state of the Section-1 is checked forward, the occupied state of a block range, the state of foreign object intrusion, and the state of red light wire breakage are checked, and if the low-frequency code of a block range can be determined, the low-frequency code of the first zone in the section departure direction can be determined in a reverse order according to a tracking coding relationship.

11. The multi-station integrated code sending control method according to claim 10, wherein in the step 105, specifically,
   when the low-frequency code of the first zone in the section departure direction cannot be determined by checking the Section-1 of the current station, a Section-2 of an adjacent station is checked; if the adjacent station is a communication station, the Section-2 does not exist, and the low-frequency code at a boundary can be determined according to boundary low-frequency code information transmitted by the adjacent station, so that the low-frequency code of the first zone in the section departure direction can be obtained in a reverse order; and if the adjacent station is a station under integrated supervision, the Section-2 of the adjacent station section is checked according to step 104.

12. The multi-station integrated code sending control method according to claim 11, wherein in the step 106, specifically, if the low-frequency code cannot be determined by checking the Section-2 of the adjacent station, for a relay station, processing is exited to return to the step 101 and the low-frequency coding processing of this receiving route Route-1 is finished, and for a stop, a home signal of the Section-2 of the adjacent station and the state of an arranged receiving route are checked.

13. The multi-station integrated code sending control method according to claim 11, wherein in the step 107, specifically,
   when the home signal corresponding to the step 106 is turned on but the low-frequency code of an arranged receiving route is not determined in this time of station traversal, processing is exited to return to the step 101, and the low-frequency coding processing of this receiving route Route-1 is finished; and when the home signal is turned off or the low-frequency code of the arranged receiving route has been determined, the low-frequency code of an approach zone of the adjacent station corresponding to the Section-2 of the adjacent station can be determined according to the tracking relationship, so that the low-frequency code of the first zone in the section departure direction of the Section-1 of the current station can be obtained in a reverse order.

14. The multi-station integrated code sending control method according to claim 6, wherein conducting section traversal in the receiving direction and calculating low-frequency codes thereof comprises:
   step 201. conducting section traversal in the receiving direction to determine the low-frequency code of an approach zone of a Section-0, and finally determining the low-frequency code of the whole Section-0 in a reverse order;
   step 202. determining a first low-frequency coding logic of an approach zone of a section;
   step 203. determining a second low-frequency coding logic of an approach zone of a section; and
   step 204. determining the low-frequency code of a receiving zone, and obtaining the low-frequency code of the whole Section-0 in a reverse order according to the low-frequency code of the approach zone.

15. The multi-station integrated code sending control method according to claim 14, wherein in the step 202, specifically, for a relay station, an adjacent station in front is analyzed; if the adjacent station is a communication station, the low-frequency code at a boundary is determined according to boundary low-frequency code information transmitted by the adjacent station, so as to obtain the low-frequency code of an approach zone; and if the adjacent station is a station under integrated control, processing is exited to return to the step 201, and this time of section traversal will not be processed for the time being.

16. The multi-station integrated code sending control method according to claim 14, wherein in the step 203, specifically, for a non-relay station, a home signal of the current receiving section Section-0 and the state of an arranged receiving route are checked; and if the home signal is turned on but the low-frequency code of an arranged receiving route is not determined in this time of station traversal, processing is exited to return to the step 201, and otherwise, the low-frequency code of an approaching zone can be determined according to the tracking relationship.

17. The multi-station integrated code sending control method according to claim 5, wherein the station traversal in the departure direction specifically comprises: for each time of independent traversal, conducting section traversal in the departure direction and calculating low-frequency codes thereof first, and then traversing established departure routes and calculating low-frequency codes thereof.

18. The multi-station integrated code sending control method according to claim 17, wherein during section traversal in the departure direction, specifically, consistent with the section processing logic in the receiving direction, an "approach zone" is converted into a "boundary zone", and after the low-frequency code of the boundary zone is determined, the low-frequency code of the whole section in the departure direction is determined in a reverse order.

19. The multi-station integrated code sending control method according to claim 17, wherein the traversal of the departure route is consistent with the processing logic of the receiving route, the splicing routes are searched, the adjacent sections are checked, the low-frequency code of the first zone in the section departure direction is obtained, and all the splicing routes are obtained in a reverse order.

20. An electronic device, comprising a memory and a processor, wherein the memory stores a computer program, characterized in that, the processor, when executing the program, implements the method of claim 1.

21. A computer-readable storage medium storing a computer program, wherein the program, when executed by a processor, implements the method of claim 1.

* * * * *